United States Patent [19]

Woo

[11] 3,892,686

[45] July 1, 1975

[54] CELLULAR PRODUCTS PRODUCED BY FOAMING AND CROSS-LINKING AROMATIC POLYSULFIDES

[75] Inventor: Gar Lok Woo, Tiburon, Calif.

[73] Assignee: Chevron Research Company, San Francisco, Calif.

[22] Filed: Mar. 26, 1973

[21] Appl. No.: 344,694

Related U.S. Application Data

[63] Continuation-in-part of Ser. No. 253,144, May 15, 1972.

[52] U.S. Cl......... 260/2.5 A; 260/2.5 R; 260/2.5 N; 260/2.5 AM; 260/2.5 AK; 260/2.5 BE; 260/18 TN; 260/30.8 R; 260/37 N; 260/858; 260/859
[51] Int. Cl. ................. C08g 53/08; C08j 1/22
[58] Field of Search ....... 260/2.5 R, 2.5 AP, 75 TN, 260/77.5 R, 2.5 A

[56] References Cited
UNITED STATES PATENTS

| | | | |
|---|---|---|---|
| 3,114,723 | 12/1963 | Hunter | 260/2.5 R |
| 3,494,966 | 2/1970 | Geering et al. | 260/2.5 R |
| 3,498,936 | 3/1970 | Wilson | 260/2.5 AP |

*Primary Examiner*—Morton Foelak
*Attorney, Agent, or Firm*—G. F. Magdeburger; John Stoner, Jr.; Thomas G. DeJonghe

[57] ABSTRACT

Sulfur-based foams produced by reacting aromatic carbocyclic or heterocyclic compound substituted by —OH, or —NHR groups with molten sulfur to form an aromatic polysulfide, cross-linking the product, generating $CO_2$ or COS in situ before cross-linking is complete, and cooling the foamed product to ambient temperature. In a preferred embodiment the product of the aromatic carbocyclic compound and sulfur is modified with certain carboxy, sulfonic, phosphonic, phosphinic, boronic or borinic acids and cross-linking and $CO_2$ generation is accomplished by addition of a polyisocyanate. Additional sulfur and liquid organic polysulfides may be incorporated in the foams.

40 Claims, No Drawings

CELLULAR PRODUCTS PRODUCED BY FOAMING AND CROSS-LINKING AROMATIC POLYSULFIDES

CROSS-REFERENCE TO RELATED APPLICATION

This application is a continuation-in-part of copending application Ser. No. 253,144, filed May 15, 1972.

BACKGROUND OF THE INVENTION

1. Field of the Invention

This application is directed to rigid, or semi-rigid, sulfur-containing cellular materials which are particularly suitable for use in building applications, particularly where insulating properties are desirable.

In the past some use has been made of rigid cellular materials or "foams" in applications where insulation and sound absorption characteristics were desired. In general, the materials which have had sufficient strength for use in such applications as building and pavement construction, etc., have comprised foamed synthetic resins such as polyurethanes, polystyrenes, etc. While these materials have been used successfully in many applications, their widespread use in construction has been limited because of the relative high cost of the polyurethanes and the fact that no satisfactory method has been found for the field production of polystyrene. It is therefore desirable that rigid foams be provided which are of low cost and which may be easily produced at field sites.

Attempts to incorporate sulfur, a low-cost, readily available raw material, into rigid foam formulations have not been entirely successful because of the difficulties of producing stable foams without hydrogen sulfide, the use of which results in the presence of lingering odor in the finished materials. It Patteson, therefore highly desirable that rigid foams be produced which are economical due to the incorporation of substantial amounts of sulfur and which, because no hydrogen sulfide is employed or formed in foam generation, are relatively odorless and possess advantageous features equal to other foams such as those based upon costly synthetic resin formulations. These features include light weight combined with high strength and good insulating and moisture resistance properties. Additionally, the compositions should have low flammability and should be resistant to attack by most organic solvents.

2. Description of the Prior Art

The condensation of sulfur with phenol has been described by Wegler, Kuehle, and Schaefer in an article, "Recent Methods of Preparatory Organic Chemistry, Reactions of Sulfur with Araliphatic and Aliphatic Compounds", *Angew. Chem.*, Vol. 70, No. 12, pp. 351–67 (June 1958). About 3 parts of phenol were reacted with 1 part of sulfur in the presence of water and NaOH.

U.S. Pat. No. 3,494,966 describes the production of phenolic polyols in which the hydroxy substituted rings are linked by sulfur linkages of preferably less than about 2 sulfur atoms and in which at least 60% of all —S—C< bonds of the phenol-sulfide groups are ortho to at least one hydroxy group per hydroxy substituted aromatic ring.

Canadian Patents 879,722 and 879,723 disclose methods of forming phenol-polysulfides useful for conversion to mercaptophenols by reacting phenol and sulfur in the presence of Friedel-Crafts type catalysts.

U.S. Pat. No. 3,337,355 discloses a process for making solid foamed sulfur by heating the sulfur to above its melting point, blending a stabilizing agent with the molten sulfur, blending a viscosity increaser with the molten sulfur, forming bubbles in the molten sulfur, and cooling it below its melting point.

SUMMARY OF THE INVENTION

It has now been found that superior rigid cellular materials can be produced by foaming polysulfide bridged aromatic compounds obtained by contacting elemental sulfur at elevated temperatures with certain substituted aromatic carbocyclic or aromatic heterocyclic compounds. The cellular foams are produced by reacting one mol of the aromatic carbocyclic or heterocyclic compound containing at least one functional group of the class —OH or —NHR, in which R is H or lower alkyl with at least 2 mols of molten sulfur to form an aromatic polysulfide. This material is cross-linked in molten state by a compound having at least 2 reactive sites capable of reacting with the —OH or —NHR group present in the polysulfide.

A reagent system capable of generating $CO_2$ or COS in situ is introduced into the product while it is still in molten state and prior to completion of cross-linking reaction to foam the material. The material is then cooled to ambient temperature forming a cellular foam.

Cross-linking agents which may be employed to effect cross-linking of the aromatic polysulfide materials by reaction with their functional groups are exemplified by the polyepoxides, particularly diepoxides of the types employed in making epoxy resins, and polyisocyanates or isothiocyanates. The epoxides thus include the epoxy resin prepolymers prepared by reacting bisphenol A with epichlorohydrin.

The gas-producing reagent system which is introduced during cross-linking may comprise a combination of a strong acid such as sulfuric, etc., with a carbonate such as sodium or calcium carbonate, etc., or a bicarbonate such as sodium or potassium bicarbonate. A weaker typical organic acid such as acetic, propionic, benzoic, etc., may be used with the bicarbonates for in situ $CO_2$ generation. When, however, a polyisocyanate is used as the cross-linking agent and is introduced in the presence of an acid, it possesses the advantage of generating the $CO_2$ necessary for foam formation as well as cross-linking the polysulfide. Further, when particular organic carboxylic acids which will be described are employed and are introduced into the molten polysulfide mixture, the incorporation of substantial amounts of the acids into the polysulfide structure results when polyisocyanate is added in additional cross-linking usually by polyamide formation resulting from reaction of the isocyanate and the acidic groups with the concomitant generation of $CO_2$ in situ promoting the formation of a fine, closed cell structure in the resulting product.

The polyamide cross-linking is, of course, in addition to the polyurethane, or polyurea linking resulting from the reaction of the isocyanate with the hydroxyl or amino groups present on the aromatic rings. Isothiocyanates may be employed as reactants in like manner with equal effectiveness. When the isothiocyanates are employed the evolved gas is COS.

In producing the foamed products, in addition to the basic components described, there may also be employed additional sulfur up to several times the weight of the aromatic polysulfide, stabilizing agents sometimes useful when additional sulfur is employed, surfactants, and aliphatic polysulfides which impart flexibility to the foams.

DESCRIPTION OF THE PREFERRED EMBODIMENTS

The following illustrates the production of preferred products which exemplify the foams obtained.

The aromatic compound contains from about 4 to 24 carbon atoms, in the case of a carbocyclic compound has a stabilization energy (SE) of at least 20 Kcal/mol, and in the case of a heterocyclic compound has a stabilization energy of at least 10 Kcal/mol. The aromatic compound is substituted by at least one, and preferably from 1 to 4 groups of the formula —OH or —NHR in which R is hydrogen or alkyl of 1 to 6 carbon atoms. The aromatic compounds will contain at least two and preferably at least three ring hydrogens per molecule. From about 0.5A to 50A parts of elemental sulfur, preferably about 2A to 9A parts, will be contacted with each part of the aromatic compound, A being a number equal to the average number of —OH or —NHR groups in the aromatic compound on a molar basis. The mixture is heated for a period of from about 1 to about 24 hours at a temperature above about 120°C, preferably from about 120° to 250°C, to form a polyaromatic polysulfide foam precursor (FP). Foaming is accomplished in the following manner. The polysulfide bridged product is contacted at a temperature of from about 100° to 200°C with from about 0.002 to 0.50, preferably 0.005 to 0.15, acid equivalents per 100 g. of the foam precursor of an acidic compound of one of the following types:

1. Acids of the formula

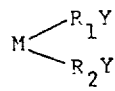

in which Y is

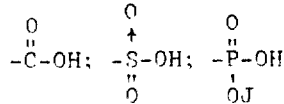

in which J is H or alkyl of 1 to 6 carbon atoms;

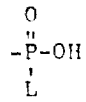

in which L is H, hydrocarbyl of 1 to 18 carbon atoms, or is a group the same as the other group attached directly to the phosphorus atom through a carbonphosphorus bond;

in which J is as previously defined; or

in which Q is H, hydrocarbyl of 1 to 18 carbon atoms, or is a group the same as the other group attached directly to the boron atom through a carbon-boron bond; $R_1$ and $R_2$ are divalent hydrocarbon radicals of 1 to 20 carbon atoms which may be substituted by up to two halogen, hydroxyl or mercapto groups per radical and may contain from 1 to 3 vinylene or ethynylene groups per radical, M is O, $S_f$ or $-(CH_2+)_f$, $f$ is an integer of 1 to 10, and the sum of the carbon atoms in $R_1$ and $R_2$ is from 2 to 18.

2. Acids of the formula

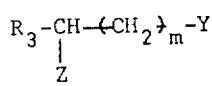

in which Y is as previously described, $R_3$ is H or a hydrocarbyl radical of 1 to 18 carbon atoms which may be substituted by up to two halogen, hydroxyl, or mercapto groups and may contain from 1 to 3 vinylene or ethynylene groups, Z is hydroxy, halogen, or mercapto group or H when $m$ is greater than 0, $m$ is an integer of 0 to 18, and the sum of the carbon atoms in $R_3$ and $-(CH_2+)_m$ is from 1 to 19.

3. 2 to 5 unit addition oligomers of the unsaturated acids of (2).

4. Unsaturated acids of the formula

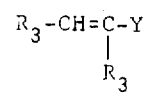

wherein $R_3$ and Y are previously defined.

5. 2 to 5 unit addition oligomers of the acids of (4).

6. Heterocyclic acids of the formula

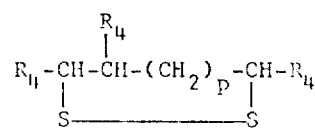

in which $R_4$ is H, Y as previously defined, an aliphatic hydrocarbon radical of 1 to 10 carbon atoms, or an aliphatic hydrocarbon radical of 1 to 10 carbon atoms substituted with acid group Y as previously defined, wherein at least one $R_4$ is a carboxy radical or a substituted aliphatic hydrocarbon radical, and wherein $p$ is 1 or 2.

7. Partially esterified polybasic acids which may contain a hydroxy, mercapto, carboxy, vinylene or ethynylene group, and have an acid equivalent weight (molecular weight divided by the number of free acid groups) within the range of about 100 to about 1,000.

8. Acids of the formula

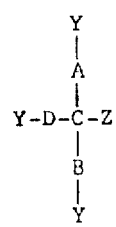

in which Y is as previously defined, A, B, and D are independently $C_nH_m(R_{11})_p(R_{12})_q$, $n$ is an integer 0 to 5, $p$ is an integer 0 to 2, $q$ is an integer 0 to 1, $R_{11}$ is alkyl of 1 to 4 carbon atoms, Z is H, OH, or SH, $m$ is an integer equal to or less than $2n-p-q$, $R_{12}$ is OH or SH, and in at least 2 of A, B and D, $n$ is equal to or greater than 1.

9. Acids of the formula $R_{13}Y$ in which Y is as previously defined and $R_{13}$ is a hydrocarbon group of 3 to 24 carbon atoms in which Y is attached to $R_{13}$ through an alicyclic group of 3 to 12 carbon atoms.

10. Acids of the formula

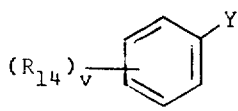

in which Y is as previously defined, $R_{14}$ is SH, an aliphatic hydrocarbon radical of 2 to 24 carbon atoms or a cycloaliphatic hydrocarbon radical of 5 to 20 carbon atoms, and $v$ is an integer 1 to 5.

This reaction is generally complete in a period of from about 1 minute to 10 hours, usually 5 minutes to one hour. The product formed is called a modified foam precursor (MFP). High ratios of acid within the prescribed range can be used to prepare a concentrate which can be later diluted with additional sulfur and the foaming process continued.

This material is then foamed by mixing it with a compound of the formula $R_5(NCX)_n$ in which $R_5$ is a polyvalent organic radical, X is a chalcogen having a molecular weight less than 33, and $n$ is an integer at least 2, and allowing the mixture to cool below its softening point. The isocyanate is employed in sufficient quantity to provide a sufficient number of isocyanate groups to react with at least 10%, preferably 50% and most preferably with about 100% of the acid groups present. In those mixtures having functional groups that are more reactive than carboxyl groups, i.e. aliphatic hydroxyl and amino groups, enough isocyanate groups must be added to react with all of the more reactive groups, plus enough more to react with the requisite number of carboxyl groups. Extra isocyanate may be used to react with the functional groups less reactive than the carboxyl group, but it is preferred not to use an excess of isocyanate over that required by all functional groups present.

USE OF ADDITIONAL SULFUR

In another embodiment of the invention additional elemental sulfur may be mixed with the aromatic compound-sulfur reaction product prior to or after addition of the acid. This additional amount of sulfur, which may be employed in amounts up to the amount which will provide no more than about 50 parts of total sulfur, per part of the aromatic compound, does not need to be contacted with the product for an extended length of time as in the case of the original aromatic compound-sulfur reaction and thus it may be added to the reaction product in solid or in molten form, mixed thoroughly, and the acid blended into the resulting mixture. Alternatively, it may be blended in after the reaction of the acid with the aromatic-sulfur reaction product. When this additional quantity of elemental sulfur is employed, it is preferable, depending on final viscosity, to use a stabilizing agent in the composition. Those compositions having a low viscosity are substantially improved by the addition of a stabilizing agent. The final viscosity is dependent upon the nature of the acid employed. Those acids leading to a high degree of crosslinking give high viscosity products. Such acids are (1) those having multiple functional groups in addition to the acid group and (2) the unsaturated acids, e.g. acrylic acid.

For each 100 g. of additional sulfur added to the foam precursor, from about 0.002 to 0.50 equivalents of additional acid must be added. For most foams, 0.005 to 0.15 equivalents will be sufficient.

The quantity of stabilizing agent to be employed ranges from 0 to 25% preferably 0 to 10%, by weight based on total sulfur and aromatic compound present.

The stabilizing agent is a finely divided inert material having individual particles which are plate-like in form. Examples of stabilizing agents are ground mica, aluminum pigment, those clays having plate-like particles such as some kaolin or china clays, those talcs having plate-shaped particles, those sands having plate-shaped particles such as certain silicon oxides, and plate-shaped organic pigments such as that sold under the trade name Permanent Yellow which is the coupling product between diazotized p-nitroaniline and acetoacetanilide and that sold under the trade name Hansa Yellow G which has the general formula:

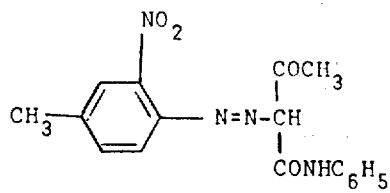

Either one or a combination of the stabilizing agents may be used. The stabilizing agents are disclosed in U.S. Pat. No. 3,337,355, previously mentioned.

By the stabilizing agent being inert it is meant that it will not react with the sulfur, the aryl compound, etc., to such a degree that it will decompose the structure or prevent the formation of bubbles within the material. Besides, inert fillers such as fiber glass can be used to strengthen foam properties or reduce cost.

THE AROMATIC COMPOUNDS

Examples of suitable aromatic compounds which may be used include those compounds having a stabilization energy (SE) of at least about 20 Kcal/mol for the carbocyclic compounds and at least about 10 Kcal/mol in the case of the heterocycles. Stabilization energy is defined as the difference in heat of combustion between the aromatic compound and that amount calculated for the hypothetical corresponding compound considered without reference to its aromatic character. Thus the actual heat of combustion of benzene is compared with that calculated for the hypothetical compound, 1,3,5-cyclohexatriene.

Examples of suitable aromatic carbocyclic compounds which may be employed include those compounds wherein the nucleus is benzene, toluene, biphenyl, biphenylene, naphthalene, azulene, diphenyl sulfide, diphenyl ether, triphenylamine, diphenyl methane, dimethyl diphenylmethane, etc. Each nucleus may be substituted with from one to three, preferably not more than one hydroxy, amino or secondary amino group for each aromatic ring.

Examples of suitable compounds of this type include phenol, resorcinol, p,p'-dihydroxydiphenyl, aniline, 4-mercaptophenol, p-hydroxy aniline, etc.

In the case of the heterocyclic compounds these may include those compounds which have as nuclei monocyclic or polycyclic units and may contain, for example, one heterocyclic and one carbocyclic ring as well as mixed heterocyclic rings. The heteroatoms which may be present include oxygen, nitrogen, and sulfur.

Examples thus of the suitable heterocyclic nuclei (which will be substituted by the required hydroxy or amino groups) include furan, thiofuran, pyrrole, isopyrrole, thiophene, pyridine, indole, quinoline, skatole, 1,2,3-triazole, 1,2,4-triazole, isoxazole, oxazole, thiazole, isothiazole, 1,2-oxadiazole, 1,2,3,4-oxadizole, 1,2,3,4-oxatriazole, 1,2,3-dioxazole, triazine, p-isoxazine, oxepin, indene, isoindene, benzofuran, thionaphthene, 2-isobenzazole, benzoxazole, 1,2-benzopyran, chromone, quinoline, etc. The described nuclei may be substituted by lower alkyl groups.

The preferred aromatic compounds are the carbocyclic materials substituted by hydroxy groups. Most preferred is phenol.

ACIDS USEFUL AS MODIFIERS

The acids useful in the formation of the foam products of this invention are those acids which are soluble in the foam precursor or are liquid at reaction conditions, i.e. melt below 250°C. It is preferred that the acids have a boiling point above 100°C, preferably above 140°C, but melt below 160°C. The carboxylic acids are preferred, and the acids will be described in terms of the carboxy containing acids. However, it should be understood that since the sulfonic, phosphonic, phosphinic, boronic, and borinic acids are effective modifiers, the respective homologs of each of the following described carboxylic acids can be employed. The polybasic phosphorus and boron acids may be partially esterified by lower alkyl groups, e.g., those of 1 to 6 carbon atoms. The phosphinic and borinic acids may contain additional groups as described, usually the same group attached directly to the respective phosphorus or boron atoms.

Carboxylic acids of the first type include dicarboxylic aliphatic acids such as glutaric, pimelic, adipic, azelaic, etc., oxo linked acids such as diglycolic acid and thio and dithio linked acids. Examples of the thio linked diacids include thiodipropionic, thiodibutanoic, thiodipentanoic, thiodihexanoic, etc. Examples of the dithiodicarboxylic acids include dithiodiglycolic, dithiodipropionic, dithiodibutanoic, dithiodipentanoic, dithiodihexanoic, dithiodibenzoic, etc.

Examples of suitable unsaturated carboxylic acids of type (2) and (4) which may be employed include alkenoic acids such as acrylic, 2-chloroacrylic, methacrylic, propargylic, crotonic, pentenoic, hexenoic, oleic, $\Delta^{9,10}$-decylenic, palmitoleic, linoleic, linolenic, eleostearic, parinaric, toriric, etc., and aryl substituted materials such as cinnamic acid, $\alpha$-phenylcrotonic, etc.

The addition oligomers of these acids (types 3 and 5) which may be suitably employed include such materials as the dimers and trimers, etc., of oleic, linoleic, and tall oil fatty acids which are prepared by double bond addition and have found use previously in modifying alkyd resins. Materials of this type are described in *Fatty Acids and Their Industrial Applications*, edited by E. Scott Patterson, Marcel Dekker, Inc., 1968.

Addition oligomers of the acids of type (4) which are acrylic or substituted acrylic acids, may also be used (type 5).

Examples of other suitable carboxylic acids of type (2) having the general formula:

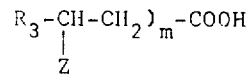

which may be employed in this process include the halogen-containing acids such as chloroacetic, bromoacetic, $\alpha$-chloropropionic, $\beta$-chloropropionic, etc., hydroxy-containing acids such as glycolic and lactic, etc., and mercapto substituted acids such as $\alpha$-mercapto acetic acid, $\beta$-mercapto propionic acid, mercapto butanoic acids, mercapto pentanoic acids, 6,8-dimercapto octanoic acid, etc.

Examples of acids of type (6) containing a cyclic dithio structure include 1,2-dithiolane-4-carboxylic acid, 1,2-dithiane-3,6-dicarboxylic acid, 6,8-thioctic acid, etc., and, of course, the sulfonic, phosphorus and boron containing acid homologs.

Examples of suitable compounds of type (7) (using the carboxy acids as examples) are illustrated as follows:

1. Half esters of dibasic acids having the formula

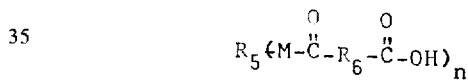

wherein $R_5$ is a hydrocarbon group having a valence equal to $n$ and from 1 to 150 carbon atoms or a polyether group having from 4 to 150 carbon atoms, said polyether comprising monomer units of 2 to 12 carbon atoms, and in which $R_5$ may be substituted by up to about 6 hydroxy or mercapto groups; M is $N-R_7$, S or O; $n$ is an integer of 1 to 3 when $R_5$ has 1 carbon atom and $n$ is 1 to 5 when $R_5$ has 2 or more carbon atoms; $R_6$ is a hydrocarbon di radical having from 2 to 24 carbon atoms and may be substituted with from 1 to 2 hydroxy or mercapto groups; and $R_7$ is H or an alkyl group of 1 to 4 carbon atoms.

2. Mono- or diacid terminated polyesters formed by the reaction of one or more dibasic acids with one or more glycols, said polyesters having the formula:

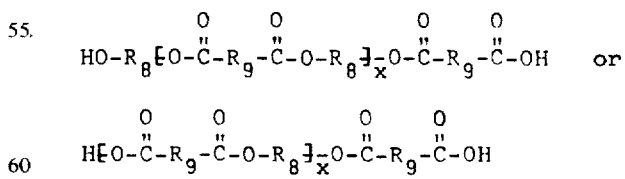

wherein $R_9$ is a hydrocarbon diradical or mixture of diradicals having from 2 to 24 carbon atoms and $R_8$ is a hydrocarbon diradical or mixture of diradicals having from 2 to 12 carbon atoms, a polyether group or mixture of groups having from 4 to 24 carbon atoms, and either $R_8$ or $R_9$ or both may contain 1 or 2 vinylene or ethynylene groups; $x$ is an integer of 1 to 50, preferably 1 to 20.

The acid esters of diacids can be readily prepared by processes known in the art. Thus the acid esters of maleic acid may be formed by acid catalyzed monoesterification of maleic acid or preferably by the reaction of an appropriate amount of maleic anhydride with a hydroxy or mercapto containing compound. Half-esters of alkyl or alkenyl succinic anhydride may be prepared in the same way as can the half-esters of cyclic-1,2-dicarboxylic acids.

Examples of unsaturated 1,2-di radicals represented by the group $R_6$ include:

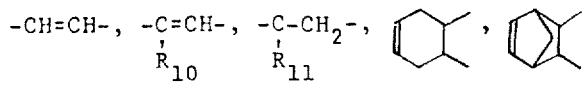

and

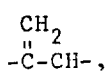

wherein $R_{10}$ is H or a low molecular weight alkyl group, and $R_{11}$ is an alkenyl group of 1 to 22 carbon atoms. Some typical acids useful as intermediates in the preparation of half-esters of this invention are maleic, fumaric, itaconic, tetrahydrophthalic, methyl maleic, ethyl maleic, allyl succinic, 2-hexenylsuccinic, 2-eicosenylsuccinic, 2-pentenylsuccinic, and methyl nadic acids. Of course, the corresponding anhydrides of the above-named acids are also useful intermediates in the preparation of half-esters.

The hydroxy or mercapto containing compounds that may be reacted with the dibasic acids described above may be selected from the following categories:

1 Mono hydroxy or mercapto compounds such as methanol, ethanol, 1- and 2-propanol, 1- and 2-butanol, 1-hexanol, 2-ethyl hexanol, 2-methyl octanol, 1-nonanol, 1-octadecanol, 1-eicosanol, 2-propen-1-ol, etc. Methanethiol, ethanethiol, 1-propanethiol, 2-propanethiol, 1-hexanethiol, etc., and mixtures thereof.

2. Poly hydroxy or mercapto compounds such as ethylene glycol, diethylene glycol, 1,4-butanediol, 2-butene-1,4-diol, 2,2-dimethyl-1,3-propanediol, 1,2-propanediol, glycerine, trimethylol propane, 1,2,6-hexanetriol, pentaerythritol, sucrose, manitol, sorbitol, 1,4-di(hydroxymethyl) cyclohexane, ,2,2'-dihydroxyethyl sulfide, etc., 2-mercapto glycerine, 1,2-dimercaptoethane, 1,2-dimercaptopropane, 2,2'-dimercapto diethylether, 1,4-dimercaptobutane, 2-butene-1,4-dithiol, 1,2-dimercaptohexane, etc. A particularly useful polyol is a commercially available material which is produced by the condensation of propylene oxide with trimethylolpropane, Pluracol TP-340, which contains 3 hydroxy groups and has a molecular weight of about 300.

3. Polyester polyhydroxy compounds such as those generally taught for use in producing polyurethane. Such materials include hydroxy and carboxy terminated polyesters such as maleic acid-polyol condensation products, castor oil, triglycerides of ricinoleic acid and the transesterification products of castor oil and glycerol or other polyols as enumerated above.

4. Polyether polyhydroxy compounds such as those formed by the base-catalyzed addition products of alkylene oxides (e.g. ethylene oxide, propylene oxide, or butylene oxide) with polyols, such as those enumerated above; and the $\alpha,\omega$-dihydroxy polyethers such as polyethylene glycol, polypropylene glycol, polytetramethylene glycol, polyhexamethylene glycol, etc.

The polyester acids useful in the present invention are readily prepared by the reaction of a dibasic acid and a dihydric alcohol by the methods well known in the unsaturated polyester art. Such processes are described in U.S. Pat. Nos. 2,195,369, 3,196,131, and 3,197,439.

The diacid terminated polyesters are made by using a slight molar excess of dibasic acid as compared to the dihydroxy compound; whereas the monoacid terminated polyesters are made by using essentially equal molar quantities of diacid and glycol. The reaction may be carried out in the absence of a catalyst or an acid catalyst may be employed. The water of esterification is removed by distillation as it forms.

Diacids useful in this process include maleic, succinic, adipic, o-phthalic, fumaric, glutaric, alkylsuccinic, hexenylsuccinic, t-butyl-i-phthalic, 1,4-di(carboxymethyl) cyclohexane, and diglycolic acid. Mixtures of the diacids may also be employed.

The carboxy acids illustrating the triacids of type (8) include citric acid, 2-carboxy-4-hydroxy-4-methyl glutaric acid, 3-carboxymethyl-5-mercapto-5-methyl adipic acid, 4-carboxy pimelic acid, 2,3-dimethyl-4-carboxyethyl suberic acid, 5-carboxyethyl azelaic acid, and 2-carboxy sebacid acid.

The acids of type (9) are illustrated by hexahydrobenzoic acid (cyclohexane carboxylic acid), cyclopentane carboxylic acid, carboxy-2,4-cyclopentadiene, carboxy-4-methyl cycloheptane, carboxy cyclooctane, and carboxy-2,4-dimethyl cyclohexane. The mixtures of commercial naphthenic acids which contain substantial portions of alkyl derivatives of cyclopentane and cyclohexane carboxylic acids are suitable reactants.

The acids of type (10) are illusutrated illustrated alkyl and alkenyl substituted acids such as ethyl benzoic acid, octadecyl banzoic acid, and the various sulfonic acids of commerce such as the alkylbenzene suulfonic acids, e.g. tetradecyl benzene sulfonic acid. Poly substituted acids such as dialkylbenzene sulfonic acid and dialkylbenzoic acid are also useful.

Mixtures of the acids can be used in modifying the aromatic polysulfides. The carboxylic acids of each of the types are preferred. Of these the unsaturated acids of types (1) and (2) described above are preferred and acrylic acid is most preferred.

Those dicarboxylic acids having the carboxyl groups on adjacent carbon atoms are unsatisfactory because they tend to form anhydrides or because they are insoluble in the mixture. Unsatisfactory acids include fumaric, maleic, and terephthalic acids.

ALIPHATIC POLYSULFIDES

In another embodiment of the invention a quantity of liquid organic polysulfide sufficient to impart flexibility to the foams is incorporated in the mixture at any point subsequent to the preparation of the aromatic compound-sulfur reaction product. The polysulfide may be employed in either type of previously described compositions--that is, those not containing and those containing additional sulfur. The liquid polysulfides are incorporated in quantities ranging from about 5 to 200 weight percent, preferably from about 20 to 100 weight percent, relative to the sulfur-aromatic compound reaction product.

The organic liquid polysulfides which are incorporated with the aromatic compound-sulfur reaction product with or without additional elemental sulfur in order to lend flexibility and shock resistance to the foams include those described in "Polysulfide Polymers", E. M. Felles and J. S. Jorczak, *Industrial and Engineering Chemistry*, November 1950, at pages 2217-23. The compounds thus are usually aliphatic disulfides, trisulfides, and tetrasulfides (usually the disulfide) which are produced by the reaction of a sodium polysulfide, such as sodium disulfide, etc., with an organic, usually an aliphatic dihalide. Among the halides which have been employed are methylene dichloride, ethylene dichloride, propylene dichloride, glycerol dichlorohydrin, epichlorohydrin, dichloroethyl ether, dichloromethyl formal, dichloroethyl formal, and triglycol dichloride. The reactants may include minor amounts of trifunctional or tetrafunctional halides, the presence of which will cause cross linking and increase the viscosity of the resulting polymers. Usually, not more than about 10%, preferably about 2% cross linking is preferred.

The preferred materials are those which are termed polysulfide liquid polymers marketed by the Thiokol Corporation under the designations LP-2, LP-3, etc. The liquid polymers generally have thiol end groups and molecular weights in the range of from about 500 to 10,000, usually about 1,000 to about 8,000. The polysulfide materials are also described as polyalkylenepolysulfides, or polythiomercaptans, or where the dihalide monomer is predominately ether and/or formal, etc., a polyoxyalkylenepolysulfide.

The polysulfides may be incorporated at any point in the process of preparing the foams after the first step (reaction of aromatic compound and sulfur) and prior to addition of the polyisocyanate or polyisothiocyanate. It is, however, preferable that the polysulfide be incorporated into the foam precursor prior to introduction of the carboxylic acid modifier. It is further preferred that an additional quantity of the modifier, up to about 1 equivalent of acid per mol of the polysulfide, be incorporated into the mixture. Thus the heating of the polysulfide with the foam precursor will allow incorporation of the flexible primary aliphatic groups into the more rigid aromaticpolysulfide chains imparting flexibility to the final product.

In another embodiment of the invention, in addition to or in place of the liquid polysulfides there may be incorporated into the mixture long chain substantially aliphatic polyols which will act as flexibility-imparting agents. When the polyols are employed additional isocyanate or isothiocyanate should be used to react with the polyol groups. Likewise, with the polysulfides sulfhydril groups and any other reactive groups present such as hydroxyl, etc., should be reacted with sufficient isocyanate to assure complete reaction.

The addition of the flexibility-imparting agents is important in such uses wherein the foam may be subject to physical shock, such as in the below-pavement insulation and the protection and insulation of movable objects.

THE POLYISOCYANATES

The organic polyisocyanates which may be employed include aromatic and aliphatic as well as heterocyclic materials. Examples of suitable aromatic materials, include tolylene 2,4-diisocyanate, 4,4'-diphenylmethane diisocyanate, tolylene 2,6-diisocyanate, polymethylene polyphenyl isocyanate (polymeric material made by Upjohn), bitolylene diisocyanate, dianisidene diisocyanate, triphenylmethane diisocyanate, and 3,3'-dichloro4,4'-diphenylene diisocyanate. The aliphatic and cycloaliphatic materials which may be employed include such materials as ethylene diisocyanate, ethylidene, diisocyanate, propylene-1,2-diisocyanate, cyclohexylene-1,2-diisocyanate, etc. The isothiocyanate analogs of these materials may be employed, examples of which include ethylidene diisothiocyanate, butylene-1,2-diisothiocyanate, and para-phenylene diisothiocyanate.

Another type of polyisocyanate useful for this invention is the so-called prepolymer adducts of a polyhydroxy, polythiol, or polyamino compound and excess polyisocyanate. For example, the product from the reaction of one mol of ethylene glycol and two mols of toluene diisocyanate. In general the pre-polymers have the formula:

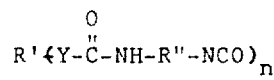

wherein R' is the nucleus of a polyhydric compound having n hydroxy groups, R" is a diradical, Y is O, S, or NR''', R''' is H or low molecular weight alkyl group or an aryl group, and n has a value of 2 6 . Typical compounds include the reaction product of toluene diisocyanate with diethylene glycol, of p,p'-diphenylmethane diiscyanate with trimethylolpropane, of m-xylylene diisocyanate with decane-1,10-diol, of toluene diisocyanate with the adduct of trimethylol propane and propylene oxide, toluene diisocyanate with polytetramethylene glycol, etc. The preferred polyisocyanates are aromatic diisocyanates having boiling points higher than 130°C and are soluble or liquid at reaction conditions.

PREPARATION OF THE AROMATIC POLYSULFIDE FOAM

The reaction of the aromatic material and sulfur may be carried out in conventional equipment in which adequate stirring is provided to ensure contact of the reactants. The time of reaction will generally be from about 1 to 24 hours, preferably from about 4 to 12 hours. The temperature during the reaction is maintained above about 120°C and preferably at about 140°C to 170°C. Preferably this reaction is carried out in the presence of a basic catalyst, e.g. sodium or calcium hydroxide. Alkali metal or alkaline earth metal oxides or hydroxides are preferred. Usually, from about 0.05 to 5, preferably from 0.1 to 2% by weight of the catalyst will be sufficient. Prior to adding the carboxylic acid as described below, it is preferable to neutralize the basic catalyst by the addition of an inorganic acid such as sulfuric or phosphoric acid. However, the catalyst may also be neutralized with excess carboxylic acid.

Following the reaction the product may be cooled and stored for later use, or, alternatively, may be maintained in its molten state and used immediately for reaction with an acid in the same reaction vessel. Addition of the acid and its reaction with the polyaromatic sulfide foam precursor (FP) will generally take from about 1 minute to 4 hours, preferably from about 5 minutes to 2 hours.

Again, this product (MFP) may be cooled and stored for use at a later time or it may be reacted immediately with the organic polyisocyanate or polyisothiocyanate in order to produce a formed material.

Temperature during the isocyanate addition will generally be maintained between about 100° and 180°C, preferably between 110° and 140°C. Since the reaction is carried out when the material is molten and generally above 110°C, it is not necessary to employ the conventional materials which are used to accelerate the reaction between polyisocyanates and active hydrogen-containing resins. However, these materials may be employed if desired. Reaction with the isocyanate may be accomplished in the original reaction vessel or in another suitable vessel from which the foam may be extruded and placed in molds, onto moving belts, etc., before cooling.

SURFACTANTS

Conventional surfactants which are used to stabilize plastic foams may be used in the foams of this invention. These commonly employed surfactants are described in *Plastic Foams*, vol. I, C. S. Benning, Interscience Publishers, 1963, at page 183 and pages 488–91 and in *Polyurethane Technology*, Bruns, Interscience Publishers, 1969, pages 50–53.

The most effective of the surfactants in foam production are the organosilicones, an example of which is Dow Corning DC 193, which is a silicone-glycol copolymer. Other surfactants which have been described as being useful in foam stabilization include diisobutylene alkylated phenol, sodium alkyl sulfonate, sodium lauryl sulfonate and polyoxymethyltridecyl ether. From about 0.01 to 5% by weight of the surfactant may be employed.

The sulfur foams prepared in accordance with this invention foam rapidly after the addition of the polyisocyanates. This is a highly desirable property for continuous commercial foaming operations in which means are present to continuously remove the foam product. In some cases, and in particular in batch foaming operations, it is desirable to have a somewhat slower foaming rate. Somewhat slower rates may be effected by lowering the temperature but this has the disadvantage of causing an increase in viscosity with concomitant difficulty in obtaining a complete mixing of ingredients.

Another, and preferred, method for slowing the rates of creaming and foaming is accomplished by the addition of small amounts of $P_2S_5$ to the mixture prior to adding the polyisocyanate. The quantity of $P_2S_5$ is based upon the quantity of the aromatic carbocyclic or heterocyclic compound used in making the sulfur adduct. As much as 15% preferably about 5 to 10% by weight of $P_2S_5$ employed to retard the reaction.

The following examples illustrate the practice of this invention.

EXAMPLES

Example 1 — Preparation of Sulfur-Phenol Reaction Product 1a. 2,915 g. of sulfur and 1,350 g. of phenol plus 55 g. of 50% NaOH in 150 ml. of water were placed in a reaction vessel equipped with a heating unit and stirrer and heated with stirring to a temperature of 110°C. Hydrogen sulfide evolved. The temperature was maintained in the range of 108° to 112°C for a period of 22 hours. Then unreacted phenol and water were removed by distillation below 150°C at reduced pressure. The product was allowed to cool, yielding 3,747 g. of a tan solid material.

1b. A mixture of 470 pounds of phenol, 19 pounds of 50% sodium hydroxide and 1,000 pounds of sulfur was heated to 135°C with stirring (stirring began as soon as material became stirrable). Stirring at 135°–140°C was continued for two hours. Then the temperature was raised to 160°C (by distillation of some water at the same time). Stirring was continued at 160°–165°C for 6 hours. It was then cooled to 140°C and neutralized with 9 pounds of 86% phosphoric acid. Water and residual phenol were removed in vacuo below 170°C. The small amount of insoluble salt was removed by filtration. 1300 pounds of adduct was obtained.

Example 2 — Reaction of Dithiodipropionic Acid with PhenolSulfur Reaction Product 128 g. of the product of Example 1a and 200 g. of sulfur were melted in a vessel provided with stirrer and to the molten material at 140°C was added 28 g. of dithiodipropionic acid. The mixture was allowed to stir for a period of 180 minutes.

Example 3 — Reaction of Tolylene Diisocyanate with Modified Phenol-Sulfur Adduct 43 g. of the product of Example 2 were heated with stirring at a temperature of about 110°C. 0.6 g. of Dow Corning Surfactant DC 193 was added. Then 6.5 g. of 2,4-tolylene diisocyanate was added to the mixture. The material after being well mixed rapidly expanded to form a cellular structure. This material was allowed to cool to ambient temperature and resulted in the formation of a strong, rigid cellular material which showed good resistance to moisture penetration. Density was about 3.5 pounds per cubic foot.

Example 4 – Reaction of Dithiodipropionic Acid with Phenol-Sulfur Reaction Product To 500 g. of the product of Example 1b at 140°C was added 30 g. of dithiodipropionic acid. The mixture was stirred for 90 minutes at 140°–⅛°C.

Example 5 — Reaction of Tolylene Diisocyanate with a Modified Phenol-Sulfur Adduct 100 g. of the product of Example 4 was heated to 120°–125°C. 0.8 g. of Dow Corning surfactant DC 193 was added with stirring. Then 9.1 g. of 2,4-tolylenediisocyanate was added. The mixture was well mixed and allowed to foam. An 8 pounds per cubic foot foam was obtained.

Example 6 — Reaction of Phenol-Sulfur Adduct with Sulfur, $P_2S_5$ and Talc 6a. 4,980 g. of sulfur and 2,505 g. of the product of Example 1b was heated to 160°–165°C with stirring. Then 43.3 g. of phosphorous pentasulfide was added and reacted for 90 minutes.

6b. 340 g. of dithiodipropionic acid was added and reacted at 160°–165°C for 80 minutes. 394 g. of talc (Mistron Vapor A) was added and mixed well.

Example 7 – Reaction of Diphenylmethane Diisocyanate with Stabilized Modified Foam Precursor Having Excess Sulfur To 2,000 g. of the product of Example 6 at 140°C was added 12 g. DC 193 and 200 g. of diphenylmethane diisocyanate (Mobay Chemical, Mondur MR). The mixture was stirred well and poured into a mold. A nice fine-cell rigid foam was obtained. Its density was 8.4 pounds per cubic foot.

Example 8 — Addition of Sulfur and P₂S₅ to Foam Precursor 3,000 g. of the product of Example 1b and 6,000 g. of sulfur and 81 g. of phosphorus pentasulfide were reacted at 160°–165°C with stirring for two hours. Evolution of hydrogen sulfide ceased after about an hour of reaction.

Example 9 — Use of Acrylic Acid as Modifying Agent

To 6,000 g. of the product of Example 8 at 150°C was added 240 g. of acrylic acid with stirring. The acrylic acid was introduced by means of a syringe to the bottom of the mixture. The mixture was stirred at 140°–150°C for 100 minutes. Then it was cooled at 125°–130°C.

58 g. of DC 193 and 453 g. of diphenylmethane diisocyanate were added. After the mixture was well stirred, it was poured into a mold and heated in a 130°–135°C oven for 20 minutes. A rigid foam was obtained. Its density was 10 pounds per cubic foot.

Example 10 — Preparation of Sulfur-aniline Reaction Product 1,000 g. of aniline and 4,000 g. of sulfur were heated to 180°C with stirring. The mixture was stirred at 180°–240°C for 20 hours. A total of 200 liters of hydrogen sulfide evolved. Distillation in vacuo (1 mm) under 150°C removed 41 g. of unreacted aniline. The bottoms, 4,655 g. of dark material (when still hot) was obtained as a product.

Example 11 — Reaction of P₂S₅ with Aniline-Sulfur Reaction Product 200 g. of the product of Example 10 was heated with stirring to 145°C. 10 g. of phosphorus pentasulfide was added and reacted at 140°–145°C for 150 minutes. Hydrogen sulfide evolved.

Example 12 — Reaction of Dithiodipropionic Acid with AnilineSulfur Reaction Product 200 g. of the product of Example 11 was heated to 165°C with stirring. 12 g. of dithiodipropionic acid was added. The mixture was stirred at 160°–170°C for 60 minutes. Then 15.6 g. of talc was added and mixed well. Temperature was 163°C.

Example 13 — Reaction of Diphenylmethane Diisocyanate with Modified Aniline-Sulfur Reaction Product 50 g. of the 163°C product of Example 12 was poured into a 250 ml. beaker. 0.3 g. of DC 193 and 3.5 g. of diphenylmethane disocyanate were added. The mixture was stirred well. It foamed up to about 165 ml.

Example 14 — Use of Mercaptopropionic Acid as a Modifying Agent 14a. 1,000 g. of the product of Example 1b and 2,000 g. of sulfur were heated at 150°–200°C for four hours (mostly at 150°C) with stirring.

14b. To 391 g. of 14a at 130°–140°C there was added portion-wise with stirring, 32 g. of mercaptopropionic acid. Gas evolved during reaction of the acid with the sulfur mixture. The mixture was stirred at 140°–180°C (mostly at 140°–150°C) for 2 hours.

14c. 85 g. of 14b at 150°C was poured into a 300-ml. beaker. Then 7.0 g. of diphenylmethane diisocyanate was added. The mixture was stirred. Foaming occurred immediately. Low density foam was obtained.

Example 15 — Use of Hexamethylene Diisocyanate as Foaming Agent 15a. 359 g. of the product of Example 1a was heated with 9 g. of acrylic acid at about 145°C for 40 minutes. It was then cooled to room temperature.

15b. 54.5 g. of the product of 15a was reheated to 135°C. Then 0.2 g. of DC 193 and 4.3 g. of hexamethylene diisocyanate was added. The mixture was immediately stirred. A uniform foam resulted.

Example 16 — Use of Diglycolic Acid as Modifying Agent 16a. 50 g. of the product of Example 1b, 100 g. of sulfur and 4 g. of diglycolic acid were heated at 150°–165°C for about 2 hours.

16b. 50 g. of the product of 16a above and 5 g. of talc were mixed well at 140°C. Then 0.35 g. of DC 193 and 2.5 g. of diphenylmethane diisocyanate was added. After the ingredients were well mixed, 225 ml. of good foam developed.

Example 17 — Use of Chloroacetic Acid as Modifying Agent 17a. 100 g. of the product of Example 1b, 200 g. of sulfur and 30 g. of talc were stirred at 160°–165°C for about 2 hours.

17b. 50 g. of 17a was poured into a container. 0.35 g. of Dow Corning DC 193 silicone surfactant was added. When the mixture reached 140°C, 1.4 g. of chloroacetic acid was added and mixed well. 2.5 g. of preheated diphenylmethane diisocyanate was added. The contents were again well mixed. 290 ml. of foam was obtained initially but it collapsed to 260 ml. final volume.

Example 18 — Preparation of Foams for Physical Tests

Foams were prepared by the general procedures described above employing a phenol sulfur adduct, thiodipropionic acid, diphenylmethane diisocyanate, etc. These procedures are described in Examples 1b, 6a, 6b, and 7. The amounts of reactants used and the references to the procedures employed are set forth in the following table:

TABLE I

| Procedure | Reactants | 18-a | 18-b | 18-c | 18-d | 18-e | 18-f | 18-g |
|---|---|---|---|---|---|---|---|---|
| 1b | Phenol | 1368 | | | 470 | | | |
| | Sulfur | 2910 | | | 1000 | | | |
| | NaOH (50%) | 54.6 | | | 19 | | | |
| | Product A | 3805 | | | 1300 | | | |
| | Product A Used | 1542 | | 1000 | 1225 | 1162 | 1176 | |
| | P₂S₃ | 62 | | 40 | 28 | 19 | 29.4 | |
| 6a | Sulfur | 3150 | | 4000 | 2577 | 3390 | 2360 | |
| | Thiodipropionic Acid | — | | 1150 | — | — | — | |
| | Product B | | | | | | | |
| | Product B Used | 2000 | 2030 | 4900 | All | All | All | |
| | Thiodipropionic | | | | | | | |

TABLE I—Continued

| Procedure | Reactants | 18-a | 18-b | 18-c | 18-d | 18-e | 18-f | 18-g |
|---|---|---|---|---|---|---|---|---|
| 6b | Acid | 90 | 123 | 50 | 153 | 160 | 110 | |
| | Talc | 209 | 215 | 490 | 382 | 357 | 370 | |
| | Product C | | | | | | | |
| 7 | Product C Used | 1700 | 1700 | 3010 | 2150 | 1990 | 2172 | 1658 |
| | Surfactant (1) | 12 | 12 | 13 | 13.5 | 13.9 | 12.5 | 11.7 |
| | Diisocyanate (2) | 149.4 | 165.6 | 144 | 140 | 132 | 132.4 | 99.6 |

(1) Dow Corning DC 193 silicone surfactant
(2) Diphenylmethane diisocyanate

The following table sets forth the physical characteristics measured for the foams prepared above. The characteristics measured were: (1) density in pounds per cubic foot, (2) insulating property (K factor) expressed in BTU/Hr/Ft$^2$/°F/in., (3) compressive strength, in psi, at 10% deformation, and (4) water absorption in pounds per square foot. Water absorption was measured by immersing a block of the foam in water for a period of 24 hours and, after removing it, measuring the observed increase in weight.

TABLE II

| | 18-a | 18-b | 18-c | 180d | 18-e | 18-f | 18-g |
|---|---|---|---|---|---|---|---|
| Density | 9.3 | 7.0 | 24.7 | 11.8 | 13.2 | 17.2 | 17.9 |
| Compressive Strength, psi | 36 | — | 201 | 48 | 75 | 115 | 138 |
| K Factor | 0.27 | 0.25 | — | — | — | — | — |
| Water Absorption, lb/ft$^2$ | 0.02 | 0.05 | — | — | 0.07 | — | — |

The following examples describe preparation of the ester-linked acids of type (5) and preparation of foams employing these materials as modifying agents.

Example 19 —Preparation of Maleic Acid-polyether Triol Half Ester

A mixture of 196 g. of maleic anhydride and 210 g. of a triol having a molecular weight of about 300 formed by the condensation of propylene oxide with trimethylolpropane (Wyandotte TP-340) was heated with stirring to 150°C. Exotherm brought the temperature to a maximum 160°C. It was rapidly (in 20 minutes' time) cooled to 90°C and gradually heated back to 130°C. Stirring at 125°-130°C was continued for one hour. The product was cooled to room temperature. A viscous liquid was obtained.

Example 20 — Use of Maleic Acid-Polyether Triol Half Ester as Modifying Agent 2,763 g. of the product of Example 1b and 58 g. of P$_2$S$_5$ were reacted with stirring at 140°-145°C for 90 minutes, then cooled to room temperature.

The mixture was reheated to 145°C and 5,730 g. of molten sulfur was added. The contents were stirred at 140°-155°C for 3 hours.

To 1,017 g. of the above at 145°C was added 8.6 g. of DC-193 surfactant (Dow Corning) and 103 g. of the half ester of Example 19. The mixture was stirred for 2 minutes and became very viscous. 358 g. of 140°C molten sulfur was added and mixed well. Immediately 98 g. of diphenylmethane diisocyanate at 80°C was added. It was mixed well by stirring and poured into a mold. After cooling to room temperature, the uniform-cell rigid foam weighed 12 pounds per cubic foot.

Example 21 – Preparation of Maleic Acid-Methanol Half Ester 700 g. of maleic anhydride and 1300 g. of methanol was refluxed (73°C) with stirring for 4 hours. The excess methanol was removed by distillation in vacuo.

860 g. of water white liquid product was obtained. Infrared spectrum showed complete reaction of maleic anhydride.

Example 22 — Use of Maleic Acid-Methanol Half Ester as Modifying Agent

A mixture of 1,620 g. of the product of 1b and 3,252 g. of molten sulfur was heated at 140°-150°C for 4 hours.

To 2,000 g. of above at 147°C with stirring was added a mixture (preheated to 130°C) of 98 g. of the product of Example 19 and 49 g. of the product of Example 21 and 19.2 g. of DC-193 silicone surfactant. Stirring was continued for 3 more minutes. Then 148 g. of diphenylmethane diisocyanate was added. The mixture was stirred well, poured into a mold and heated in a 120°-130°C oven for 5 minutes. After cooling to room temperature, a light fine-celled foam was obtained, having a density of about 9 pcf.

Example 23 — Use of Maleic Acid-Polyether Triol Half Ester and Dithiodipropionic Acid as Modifying Agents a. 2,000 g. of the product of Example 1b, 4,000 g. of molten sulfur and 44 g. of P$_2$S$_5$ were stirred at 160°-165°C for 3 hours.

b. To 2,000 g. of above at 165°C was added 60 g. of dithiodipropionic acid. The mixture was heated with stirring at 160°-165°C for 1 hour and then cooled to 140°C. 20 g. of talc and 12.5 g. of DC-193 silicone surfactant were added. While being stirred, 68 g. of the product of Example 19 (preheated to 135°C) was added. Stirring was continued for 4 minutes. Then 203 g. of 140°C diphenylmethane diisocyanate was added, mixed well and poured into a mold. The foam obtained was 13 pcf.

Example 24 — Use of Maleic Acid-Polyether Triol Half Ester and Dithiodipropionic Acid as Modifying Agents 800 g. of the product of Example 1b, 1600 g. of molten sulfur and 14.4 g. of P$_2$S$_5$ were stirred at 165°-169°C for 2 hours. Then 72 g. of dithiodipropionic acid was added. Stirring at 160°-165°C was continued for 1 hour. The mixture was cooled to 140°C. 127 g. of the product of Example 19 was added (preheated to 125°C). Stirring at 140°-145°C was continued for 10 minutes. 15 g. of DC-193 silicone surfactant was added. The mixture was stirred for 5 more minutes. Then 18 g. of talc was added and mixed well followed by 242 g. of 135°C diphenylmethane diisocyanate. After being mixed well, the product was poured into a mold and allowed to foam. The top of the foam was heated with an infrared lamp for about 10 minutes during foam rise. The density of the foam was 9 pcf.

Example 25 — Use of Maleic Acid-Polyether Triol Half Ester and Dithiodipropionic Acid as Modifying Agents a. 3,184 g. of the product of Example 1b, 6,368 g. of molten sulfur and 64 g. of $P_2S_5$ were stirred at 160°-165°C for 1½ hours.

b. To 4,272 g. of above at 170°C with stirring was added 126 g. of dithiodipropionic acid. Stirring at 160°-165°C was continued for 1 hour. Then the mixture was cooled to 142°C and 227 g. of the product of Example 19 (preheated to 125°C) was added. The contents were stirred at 141°-145°C for 10 minutes. 32 g. of DC-193 silicone surfactant and 100 g. of talc was added. After the mixture was stirred for 2 additional minutes, 425 g. of diphenylmethane diisocyanate was added. The contents were stirred well and poured into a mold. The top of the foam was heated for 10 minutes with infrared lamp during foam rise. An 8 pcf uniform foam was obtained.

Example 26 — Use of Maleic Acid-Polyether Triol Half Ester and Dithiodipropionic Acid as Modifying Agents With Additional Sulfur Added nate was added to the mix, stirred well, and placed in a 140°C oven for 10 minutes. About 200 ml. of foam was obtained.

Example 29 — Use of Combination of Maleic Acid-Polyether Polyol Half Ester and Dithiodipropionic Acid as Modifiers A mixture of 4,000 g. of sulfur and 2,000 g. of a phenol/sulfur adduct prepared as in Example 1 was heated to 165°C. A 44 g. portion of $P_2S_5$ was added and the resulting mixture was stirred at 160°-165°C. for about 3 hours.

To 2,000 g. of the above mixture was added 60 g. of dithiodipropionic acid. After heating at 165°C for one hour the mixture was cooled to 140°C and 20 g. of talc (Mistron Vapor A) was added. then 12.5 g. of a silicone surfactant (DC-193) and 68 g. of a maleic anhydride/polyester polyol half ester (as prepared in Example 19) were added. Finally, to the well stirred mixture of the above ingredients there was added 203 g. of diphenylmethane diisocyanate and after a short, rapid stirring the mixture was poured into a mold and allowed to foam into place.

The following table sets forth physical data acquired for the compounds employing the partially esterified acid modifier. In addition to those date set forth in Table II flexural strength was determined by ASTM method C-203.

TABLE III

| | Foam Properties | | | |
| | Ex. 20 | Ex. 22 | Ex. 23 | Ex. 25 |
|---|---|---|---|---|
| Density, pcf | 10.6 | 9.0 | 12.9 | 7.8 |
| K Factor (ASTM D-2326) | — | — | — | 0.27 |
| Water Absorption, Vol. % (ASTM D-2127) | — | — | — | 3.4 |
| Compressive Strength, psi at 10% Deformation (ASTM D-1621) | 48 | 43 | 80 | 17 |
| Flexural Strength, psi (ASTM C-203) | — | — | — | 12 |

To 4500 g. of a product prepared in a manner similar to Example 25a was added 1500 g. of sulfur. The mixture was heated to 160°C and maintained at 160°-165°C with stirring for 1½ hours. It was cooled to 140°C. 80 g. of DC-193 silicone surfactant was added followed by 655 g. of the product of Example 19 (preheated to 100°C). Stirring at 140°C was continued for 5 more minutes. 545 g. of diphenylmethane diisocyanate was added. The mixture was stirred well, poured into a mold and heated in a 270°-280°F oven for 20 minutes. The foam was about 11 pcf.

Example 27 — Preparation of Alkenylsuccinic Acid-Triethylene Glycol Half Ester

138 F. of alkenylsuccinic anhydride (0.4 mol) prepared from maleic anhydride and $C_{15}$-$C_{20}$ isomerized alpha olefins and 30 g. of triethylene glycol (0.2 mol) was heated with stirring to 115°C. Stirring at 115°-120°C was continued for 2 hours. A viscous product was obtained after cooling to room temperature.

Example 28 — Use of Alkenylsuccinic Acid-Triethylene Glycol Ester as Modifying Agent a. 300 g. of sulfur, 150 of the product of Example 1b, and 3.1 g. of $P_2S_5$ was stirred at 160°-164°C for 1½ hours.

b. To 200 g. of the product of a at 145°C was added 44.7 g. of the product of Example 27. Stirring at 140°-150°C was continued for 1½ hours.

C. To 100 g. of the product of b at 142°C was added 2.6 g. DC-193 silicone surfactant. The mixture was stirred well. Then 11.3 g. of diphenylmethane diisocya- The foams prepared in accordance with the procedures described herein usually have in excess of 35%, frequently over 50%, closed cell structure. This is a desirable feature in insulating applications or in applications in which the foam comes in contact with water. Closed cells give the best insulation and do not absorb water.

In corrosion tests, steel in contact with foams of this invention, air and water, had a rather nominal corrosion rate in the range of about 2 to 22 mils/year; under the same conditions polyurethane foams gave corrosion rates of 1 to 9 mils/year.

The cellular materials of this invention, as previously noted, may be used for a variety of purposes wherein an inexpensive construction material with good insulating properties is desired. For example, the material may be cast or extruded in sheets and the outer surfaces covered with an appropriate material such as paper, hardboard, and laminated wood, to make sandwiches and panels, etc. Additionally, the material may be used for providing insulation in typical uses where a high degree of insulaation is desirable, such as refrigerators, camping iceboxes, cold storage rooms, etc. As previously noted, it is particularly adaptable to many of these structural uses because of its low flammability and, in fact, self-extinguishing flame characteristics. An additional advantage inheres in its low water absorption characteristics which are particularly desirable for material which is used largely for insulation or flotation.

Another particularly valuable use of the foams is in providing insulating layers in pavement construction. Thus a layer of the insulating foam placed beneath the pavement in permafrost areas of, for example, Alaska and Canada, will prevent thawing of permafrost through the pavement layer, a situation which has been found to cause sinking and buckling. Along the same lines, another advantageous use is the insulation of pipelines in permafrost regions to prevent similar thawing of the permafrost underlying the pipe. The insulation also allows the temperature of the material being pumped through the pipeline, such as oil, to remain at a higher level, thus making pumping easier and resulting in a reduced power requirement for pumping.

The following examples illustrate the preparation of compositions which incorporate either organic polysulfide or a combination of a polysulfide and a linear polyol (in the polyisocyanate prepolyol) in order to increase the flexibility and therefore the shock resistance of the foam. These characteristics are, as previously noted, particularly desirable in those applications set forth above, such as pavement underlayments and pipeline insulation, wherein for reasons of physical shock or expansion due to temperature variation stresses are placed upon the foams.

Example 30 — Semi-Rigid Foam From Sulfur and Phenol Sulfur Adduct and Low Molecular Weight Polyoxyalkylene Polysulfide To 533 g. of phenol/sulfur adduct heated to 130°C was added with stirring 203 g. of a liquid polysulfide (Thiokol LP-3, a commercially available liquid polysulfide having an average molecular weight of about 1,000 and an average mercaptan content of about 6.6%). Some foaming occurred but quickly subsided. Temperature fell to about 110°C. 1,487 g. of molten sulfur at a temperature of about 130°C was added to the mixture. The mixture was heated with stirring to about 150°C and stirred at 148°-152°C for an additional 40 minutes. 109 g. of acrylic acid was added to the bottom of the mixture with a syringe. The temperature of the mixture fell to 142°C, and it was stirred at 142°-154°C for 45 minutes. To 2,264 g. of the material was added 15.5 g. of silicone surfactant. To the mixture was added 400 g. of a polyisocyanate premix prepared by mixing 479 g. of diphenylmethane diisocyanate, 255 g. of polyether triol described in Example 19, and 15 g. of methyl diethanolamine. The mixture was stirred and foamed very rapidly giving a brownish foam.

Example 31 — Semi-Rigid Foam From Sulfur, Phenol-Sulfur Adduct, and Intermediate Molecular Weight Polyoxyalkylene Polysulfide a. 1,500 g. of sulfur and 582 g. of a phenol/sulfur adduct prepared as in Example 1 were heated to 150°C and 58 g. of a liquid polysulfide (Thiokol LP-32, which has an average molecular weight of about 4,000 and a mercaptan content of 1.75%) was added and heated for about one-half hour at 145°-150°C. 120 g. of acrylic acid were added dropwise to the mixture and reacted for one hour at 140°-146°C. The mixture was cooled to 135°C.

b. 60 g. of methyldiethanolamine was mixed with 1,020 g. of Pluracol TP-2450 (propylene oxide-trimethylol propane polymer having a molecular weight of about 2640). To this mixture was added 1,918 g. of diphenylmethane diisocyanate.

c. A 1,000 g. portion of the product of a. was placed in a vessel and mixed rapidly with 6.6 g. of silicone surfactant and 200.3 g. of the product of b. A good, strong foam having flexibility formed.

Example 32 — Semi-Rigid Foam From Sulfur, Phenol-Sulfur Adduct, and Low Molecular Weight Polyalkylene Polysulfide The process of Example 31 except that in a Thiokol LP-3 polysulfide having a molecular weight of about 1,000) was substituted for LP-32. Again a strong flexible foam formed.

Example 33 — Semi-Rigid Foam From Sulfur, Phenol-Sulfur Adduct, and Polyoxyalkylene Polymer a. 1,000 g. of a phenol-sulfur foam precursor, as prepared in Example 1b, was mixed with 2,996 g. of molten sulfur and heated to 160°C. To the mixture was added 15 g. of $P_2S_5$ and the mixture was stirred at 160°-165°C for 1½ hours and kept at 135°C overnight.

b. 1,000 g. of the product (a) was heated with 500 g. of sulfur to about 150°C with stirring. 152.3 g. of Rocure-7 (a polyoxyalkylene polysulfide produced by Fikes Chemical Company) was added to the mixture. The temperature fell to 142°C. The mixture was heated to 153°C. and 82 g. of acrylic acid were injected with a syringe into the bottom of the mixture. Stirring was continued at 144°-147°C for two hours and the mixture became homogenous.

c. To 1,574 g. of the product of (b) was added 18.8 g. of DC 195 silicone surfactant. To this mixture was added 294 g. of a polyisocyanate prepolymer prepared as in Example 31b. The mixture was stirred, poured into a mold and allowed to cool to room temperature. A semi-rigid foam with very fine cell structure was produced.

Example 34 — Reaction of Alpha Olefin Sulfonic Acid with Phenol Sulfur Reaction Product One part of phenol sulfur adduct as prepared in Example 1a was mixed with 2 parts of sulfur and 516 g. was heated to 171°C with stirring. To the mixture was added 110 g. of a $C_{15}$–$C_{18}$ alpha olefin sulfonic acid. (The sulfonic acid comprised a mixture of alkene sulfonic acids and sultones produced by the film sulfonation of an olefin fraction with $SO_3$.) The temperature of the mixture fell to 125°C. It was heated with stirring to 145°C and heating with stirring was continued at 140°-145°C one hour producing a viscous brown material.

Example 35 — Reaction of Diphenylmethane Diisocyanate with Sulfonic Acid Modified Phenol-Sulfur Adduct To a 200 g. portion of the product of Example 34 at a temperature of 130°C was added with stirring 0.8 g. of silicone surfactant. To the mixture was added 15.0 g. of diphenylmethane diisocyanate. The material foamed to a volume of 400 to 500 cc and when cooled yielded a dark rigid foam.

Example 36 — Foam from Citric Acid Modified Phenol-Sulfur Reaction Product

A 2600 g. portion of sulfur and a 1300 g. portion of phenol-sulfur adduct as prepared in Example 1a were placed in a 4-liter stainless steel pot. The mixture was stirred and heated to 160°-165°C and held at 160°-165°C for four hours. 300 g. of the mixture was placed in a flask and heated to 150°-155°C while stirring, and 12.0 g. of citric acid (Bakers Reagent Grade) was added. The mixture was heated for 45 minutes at a temperature of 148°-154°C and held for 24 minutes. 100 g. of the product was poured into a hot paper cup.

1/2 g. of DC-193 silicone surfactant was stirred into the material at 130°C, and 6.0 g. of polymethylene polyphenylisocyanate (Upjohn's PAPI 18) was added at a temperature of 125°C. The mixture foamed, giving a dense foam which, when cooled to ambient temperature, had a density of 41 lb. per cubic foot.

Example 37 — Foam from Fatty Acid Oligomer Modified Phenol-Sulfur Reaction Product The process of Example 36 was repeated combining 600 g. of the sulfur added phenol-sulfur reaction product with 100 g. of oligomerized fatty acid (Hystrene 5460, Humko Products Division of Kraftco Corporation, a material comprising 80% trimer and 20% dimer of an 18 carbon monounsaturated fatty acid). 100 g. of the modified product was reacted with 6.9 g. of polymethylene polyphenylisocyanate (PAPI 18 from Upjohn). The product, when cooled, was a fine-celled foam having a density of 21 lb. per cubic foot.

In addition to the previously described additives, in certain applications it may be advantageous to add to the foam compositions other materials, typically those which have been employed as fillers in plastic foams. Materials of this type are described in *Plastic Foams*, Vol. I, Calvin James Banning, Wiley-Interscience, 1969. Examples of such fillers include wood derived materials such as wood flour, resins, and synthetic fibers such as nylon acrylics and polyesters, inorganic salts and oxides such as heavy metal oxides to modify electrical properties, silica and various silicates, etc. Another group of materials which can be used to modify physical properties of the foams are the inorganic flakes and fibers represented by glass fiber, mica and asbestos fillers, etc.

While the character of this invention has been described in detail with numerous examples, this has been done by way of illustration only and without limitation of the invention. It will be apparent to those skilled in the art that modifications and variations of the illustrative examples may be made in the practice of the invention within the scope of the following claims.

I claim:

1. A sulfur-based foam produced by the steps of
I. mixing and stirring for a period of from 1 to 24 hours at a temperature of from about 120° to about 200°C. from about 0.5A to 50A parts of elemental sulfur with 1 part of an aromatic carbocyclic or heterocyclic compound containing from about 4 to 24 carbon atoms, said aromatic compounds being substituted by at least one group of the formula —OH or —NHR in which R is hydrogen or lower alkyl, said compound containing at least 2 ring hydrogen atoms per molecule, wherein the stabilization energy of said aromatic compound is at least 20 in the case of the carbocyclic compounds and 10 in the case of the heterocyclic compounds, and wherein A is equal to the average number of —OH or —NHR groups in the aromatic compound on a molar basis; and
II. contacting the product of (I) at a temperature of about 100° to 200°C. with from about 0.002 to 0.50 acid equivalents per 100 g. of (I) of an acid of the formula equivalents per 100 g. of (I) of an acid of the formula (i) 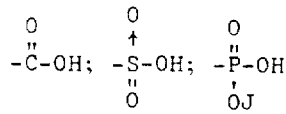

in which Y is

in which J is H or alkyl of 1 to 6 carbon atoms;

in which L is H, hydrocarbyl of 1 to 18 carbon atoms, or is a group the same as the other group attached directly to the phosphorus atom through a carbon-phosphorus bond;

in which J is as previously defined; or

-B-OH
|
Q in which Q is H, hydrocarbyl of 1 to 18 carbon atoms, or is a group the same as the other group attached directly to the boron atom through a carbon-boron bond; $R_1$ and $R_2$ are divalent hydrocarbon radicals of 1 to 20 carbon atoms which may be substituted by up to two halogen, hydroxyl, or mercapto groups per radical and may contain from 1 to 3 vinylene or ethynylene groups per radical, M is O, $S_f$ or $+CH_2+_f$, $f$ is an integer of 1 to 10, and the sum of the carbon atoms in $R_1$ and $R_2$ is from 2 to 18.

(ii) 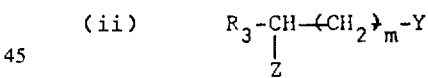

in which Y is as previously described, $R_3$ is H or a hydrocarbyl radical of 1 to 18 carbon atoms which may be substituted by up to two halogen, hydroxyl, or mercapto groups and may contain from 1 to 3 vinylene or ethynylene groups, Z is hydroxy, halogen, or mercapto group or H when $m$ is greater than 0, $m$ is an integer of 0 to 18, and the sum of the carbon atoms in $R_3$ and $+CH_2+$ is from 1 to 19.

iii. 2 to 5 unit addition oligomers of the unsaturated acids of (ii).

(iv) 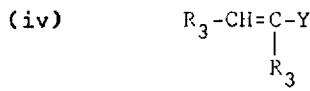

wherein $R_3$ and Y are as previously defined.

v. 2 to 5 unit addition oligomers of the acids of (iv).

(vi)    $R_4-CH-CH-(CH_2)_p-CH-R_4$
         with $R_4$ substituent on second CH, and S—S bridge between the two outer CH groups in which $R_4$ is H, Y is as previously defined, an aliphatic hydrocarbon radical of 1 to 10 carbon atoms, or an aliphatic hydrocarbon radical of 1 to 10 carbon atoms substituted with acid group Y as previously defined, wherein at least one $R_4$ is a carboxy radical or a substituted aliphatic hydrocarbon radical, and wherein p is 1 or 2.

vii. Partially esterified polybasic acids which may contain a hydroxy, mercapto, carboxy, vinylene or ethynylene group, and have an acid equivalent weight (molecular weight divided by the number of free acid groups) within the range of about 100 to about 1,000.

(viii)
$$Y-D-C-Z$$
with A above C (A bonded to Y above), and B below C (B bonded to Y below)

in which Y is as previously defined, A, B, and D are independently $C_nH_m(R_{11})_p(R_{12})_q$, n is an integer 0 to 5, p is an integer 0 to 2, q is an integer 0 to 1, $R_{11}$ is alkyl of 1 to 4 carbon atoms, Z is H, OH, or SH, m is an integer equal to or less than $2n-p-q$, $R_{12}$ is OH or SH, and in at least 2 of A, B and D, n is equal to or greater than 1.

ix. Acids of the formula $R_{13}Y$ in which Y is as previously defined and $R_{13}$ is a hydrocarbon group of 3 to 24 carbon atoms in which Y is attached to $R_{13}$ through an alicyclic group of 3 to 12 carbon atoms.

(x)     $(R_{14})_v$—(benzene ring)—Y in which Y is as previously defined, $R_{14}$ is SH, an aliphatic hydrocarbon radical of 2 to 24 carbon atoms or a cycloaliphatic hydrocarbon radical of 5 to 20 carbon atoms, and v is an integer 1 to 5.

III. contacting the product of (II) at a temperature in the range of 110°–160°C with a compound of the formula $R_5(CNX)_n$, in which $R_5$ is a polyvalent organic radical, X is a chalcogen having a molecular weight less than 33, and n is an integer of at least 2, said compound being employed in sufficient quantity to provide a number of isocyanate or isothiocyanate groups necessary to react with at least 10% of the carboxyl groups present in the product of (II), and IV. cooling the product of (III) to ambient temperature.

2. A foam as in claim 1 in which in step (III) isocyanate or isothiocyanate groups necessary to react with at least 50% of the carboxyl groups in the product of (II) are provided.

3. A concentrate suitable for use as the sulfur-containing foam precursor of claim 1 comprising the product of (II) in claim 1.

4. A foam as in claim 1 wherein an additional amount of sulfur up to about 50 parts total sulfur to one part aromatic compound is blended at a temperature above about 120°C with one part of the product of (I).

5. A foam as in claim 1 wherein an additional amount of sulfur up to about 50 parts total sulfur to one part aromatic compound is blended at a temperature above about 120°C with one part of the product of (II).

6. A foam as in claim 1 in which a quantity of up to 25% by weight of an inert, finely divided stabilizing agent is added to the product of (I).

7. A foam as in claim 4 in which a quantity of an inert, finely divided stabilizing agent sufficient to stabilize said foam is added to the product of (II).

8. The foam of claim 5 in which the stabilizing agent is talc.

9. The foam of claim 7 in which the stabilizing agent is talc.

10. The foam of claim 1 wherein the aromatic compound employed in Step (I) is carbocyclic.

11. The foam of claim 10 wherein the aromatic compound is hydroxyaromatic.

12. The foam of claim 11 wherein the aromatic compound is phenol.

13. The foam of claim 1 in which Y in the acid of step (II) is $$-\overset{O}{\underset{}{\overset{\|}{C}}}-OH.$$

14. The foam of claim 1 in which the acid employed in step (II) is an unsaturated carboxylic acid of the formula $$R_3-CH=C-COOH$$
with $R_4$ on the central C wherein $R_3$ and $R_4$ are H or hydrocarbyl of 1 to 18 carbon atoms.

15. The foam of claim 14 in which $R_3$ and $R_4$ are H.

16. The foam of claim 4 in which the acid is dithiodipropionic acid.

17. The foam of claim 4 in which the acid is dithiodiglycolic acid.

18. The foam of claim 4 in which the acid is β-mercaptopropionic acid.

19. The foam of claim 1 in which Y in the acid of step (II) is $$-\overset{O}{\underset{\underset{O}{\|}}{\overset{\uparrow}{S}}}-OH.$$

20. The foam of claim 1 in which Y in the acid of step (II) is $$-B-OH$$
with O below B in which J is H.

21. The foam of claim 1 in which the compound employed in Step (III) is aromatic.

22. The foam of claim 21 in which the compound employed in step (III) is diphenylmethane diisocyanate.

23. The foam of claim 21 in which the compound employed in step (III) is polymethylene polyphenyl isocyanate.

24. The foam of claim 21 in which the compound employed in step (III) is tolylene diisocyanate.

25. The foam of claim 1 in which from 0.05 to 5% by weight of a basic material is employed as a catalyst in steip (I).

26. The foam of claim 25 in which the basic material is an alkali metal or alkaline earth metal hydroxide.

27. The foam of claim 4 wherein an additional quantity of from about 5 to about 150% of a liquid polysulfide by weight relative to the product of step (I) is incorporated in the composition after step (I) and before step (IV).

28. The foam of claim 27 in which the liquid polysulfide is a polyalkylenepolysulfide or polyoxyalkylene polysulfide.

29. The foam of claim 28 in which the liquid polysulfide has a molecular weight of from about 500 to 10,000.

30. The foam of claim 29 in which the liquid polysulfide is a polyoxyalkylene polysulfide.

31. The foam of claim 27 wherein the liquid polysulfide is incorporated in the product of step (I) prior to step (II).

32. The foam of claim 1 in which from 2A to 9A parts of elemental sulfur are employed in step (I).

33. The foam of claim 1 in which the amount of acid employed in step (II) is from about 0.005 to 0.15 acid equivalents.

34. The foam of claim 4 in which the total sulfur is up to about 20 parts per part of aromatic compound.

35. The foam of claim 5 in which the total sulfur is up to about 20 parts per part of aromatic compound.

36. A sulfur-based foam produced by steps comprising
   a. reacting, at a temperature between about 120° and 250°c, one mol of an aromatic carbocyclic or heterocyclic compound substituted by at least 1 functional group of the class —OH or —NHR, in which R is H or lower alkyl with at least 2 mols of molten sulfur to form an aromatic polysulfide,
   b. reacting the polysulfide with from 0.002 to 0.50 g. mole acid equivalents of an organic acid per 100 grams of the polysulfide at a temperature between about 100° and 200°c. so as to obtain a polysulfide-organic acid adduct having unreacted acidic groups, and
   c. foaming said adduct by reacting, at a temperature between about 100° and 180°c., an organic polyisocyanate with the acidic groups.

37. A product in accordance with claim 36 wherein the organic acid is a carboxylic or thiocarboxylic acid.

38. A product in accordance with claim 36 wherein the organic acid is acrylic acid.

39. A product in accordance with claim 36 wherein the organic polyisocyanate is an aromatic diisocyanate having a boiling point higher than 130°C and is soluble or liquid at the foaming reaction conditions.

40. A process for producing a sulfur-based foam which comprises
   a. reacting, at a temperature between about 120 and 250°C., one mol of an aromatic carbocyclic or heterocyclic compound substituted by at least 1 functional group of the class —OH or —NHR, in which R is H or lower alkyl with at least 2 mols of molten sulfur to form an aromatic polysulfide,
   b. reacting the polysulfide with from 0.002 to 0.50 g. mole acid equivalents of an organic acid per 100 grams of the polysulfide at a temperature between about 100° and 200°C. so as to obtain a polysulfide-organic acid adduct having unreacted acidic groups, and
   c. foaming said adduct by reacting, at a temperature between about 100° and 180°C., an organic polyisocyanate with the acidic groups.

* * * * *

UNITED STATES PATENT AND TRADEMARK OFFICE
CERTIFICATE OF CORRECTION

PATENT NO. : 3,892,686
DATED : July 1, 1975
INVENTOR(S) : Gar Lok Woo

It is certified that error appears in the above-identified patent and that said Letters Patent are hereby corrected as shown below:

Col. 1, line 35, "Patteson" should read --is--.

Col. 5, line 2, "$(R_{12})_9$" should read --$(R_{12})_q$--.

Col. 10, line 39, "illusutrated illustraled" should read --illustrated--.

Col. 10, line 41, "banzoic" should read --benzoic--.

Col. 10, line 42, "suulfonic" should read --sulfonic--.

Col. 12, line 1, "materials," should read --materials--.

Col. 12, line 32, "26" should read --2 to 6--.

Col. 13, line 6, "formed" should read --foamed--.

Col. 13, line 56, "employed" should read --is employed--.

Col. 14, line 41, "140°-1/8°C" should read --140-150°C--.

Col. 14, line 48, "foam" should read --rigid foam--.

Col. 14, line 54, "43.3" should read --43.4--.

Col. 15, line 14, "at" should read --to--.

Col. 15, line 48, "disocyanate" should read --diisocyanate--.

Col. 19, line 53, "138F" should read -- 138 g --.

Col. 20, line 25, "date" should read --data--.

Col. 20, line 61, "insulaation" should read --insulation--.

Col. 22, line 7, "polysulfide" should read --(polysulfide--.

Col. 23, line 38, "modiifications" should read --modifications--.

Col. 23, lines 62-63, "equivalents per 100 g. of (I) of an acid of the formula equivalents per 100 g. of (I) of an acid of the formula" should read --equivalents per 100 g. of (I) of an acid of the formula--.

UNITED STATES PATENT AND TRADEMARK OFFICE
CERTIFICATE OF CORRECTION

PATENT NO. : 3,892,686
DATED : July 1, 1975                                    PAGE - 2 -
INVENTOR(S) : Gar Lok Woo It is certified that error appears in the above-identified patent and that said Letters Patent are hereby corrected as shown below:

Col. 24, line 54, "$(CH_2)$" should read --$(CH_2)_m$--.
Col. 24, line 55, "iii." should read --(iii)--.
Col. 24, line 67, "v." should read --(v)--.
Col. 25, line 13, "vii." should read --(vii)--.
Col. 25, line 37, "ix." should read --(ix)--.
Col. 27, line 13, "steip" should read --step--.

Signed and Sealed this thirtieth Day of December 1975

[SEAL]

Attest:

RUTH C. MASON
Attesting Officer

C. MARSHALL DANN
Commissioner of Patents and Trademarks